April 26, 1955
S. E. WEILER
2,707,042
MERCHANDISE CHUTE
Filed May 11, 1953
2 Sheets-Sheet 1
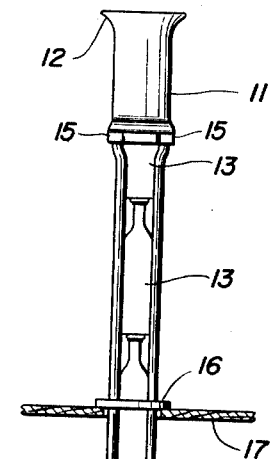
Fig. 1
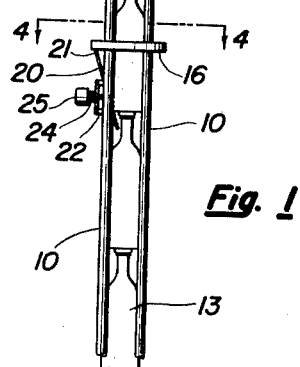
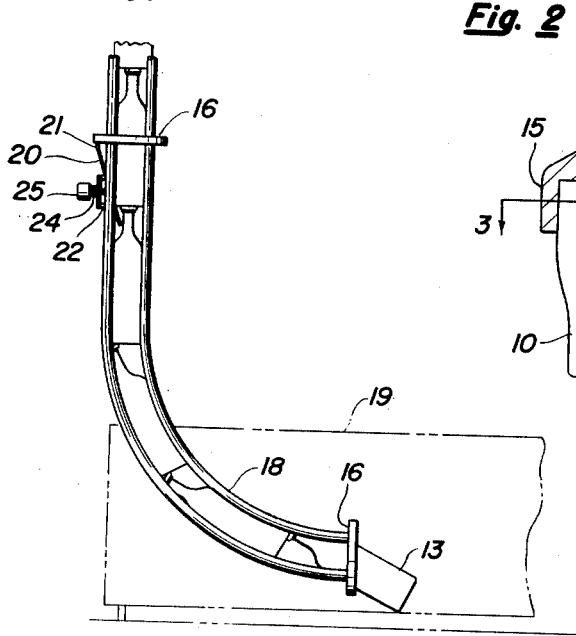
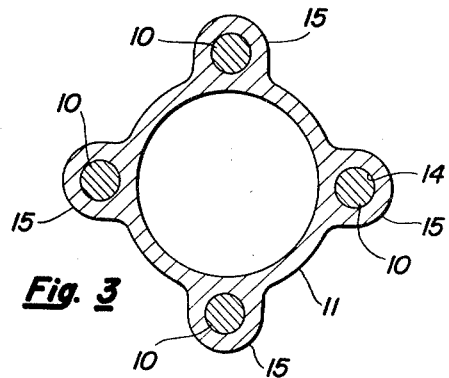
Fig. 3
Fig. 2
INVENTOR.
Stanton E. Weiler
BY
Fraser & Bishop April 26, 1955 — S. E. WEILER — 2,707,042
MERCHANDISE CHUTE
Filed May 11, 1953 — 2 Sheets-Sheet 2

INVENTOR.
Stanton E. Weiler
BY
Freas & Bishop

2,707,042

MERCHANDISE CHUTE

Stanton E. Weiler, Mansfield, Ohio

Application May 11, 1953, Serial No. 354,228

2 Claims. (Cl. 193—40)

My invention relates to improvements in chutes, and has particular significance in connection with bottle chutes useful, for example, in back of a soft drink (or "hard" drink) bar, for easily disposing of empty bottles.

In the past it has been known to have chutes and troughs for accommodating bottles and other merchandise, but, so far as I am aware, the prior art arrangements have not been especially adapted to mass manufacture because they require sheet material which must be tailored to fit each particular building and each particular size of merchandise to be handled.

Also, particularly in chutes which extend vertically, or substantially so, there has been a problem in connection with installing "retarders" furnished for the purpose of preventing breakage by retarding free fall of the merchandise. Thus, in an ordinary sheet metal (or wood) chute, substantial alteration of the sheet material must be made to accommodate one or more retarders properly spaced to meet the building and merchandise weight requirements of each particular installation.

It is an object of the present invention to provide simple means for overcoming the above-mentioned difficulties.

Another object is to provide a chute for bottles and the like, comprising a plurality of parallel rods, uniformly spaced apart at proper distance to accommodate soft drink or beer bottles, rings being welded or otherwise secured around the rods at intervals.

A further object is to provide a bottle chute of the character referred to, having a novel form of "retarder" therein for preventing free falling of bottles therethrough.

A still further object of the invention is to provide such a chute having means therein for maintaining the chute filled with bottles at all times, whereby as a bottle is inserted into the top of the chute the lowermost bottle will be ejected from the bottom of the chute.

The above objects together with others which will be apparent from the drawing and following description, or which may be later referred to, may be attained by constructing the improved bottle chute in the manner hereinafter described in detail and illustrated in the accompanying drawings, in which:

Fig. 1 is a side elevation of a bottle chute constructed in accordance with the invention;

Fig. 2 is an enlarged longitudinal sectional view of the upper tubular cap shown in Fig. 1;

Figure 4:
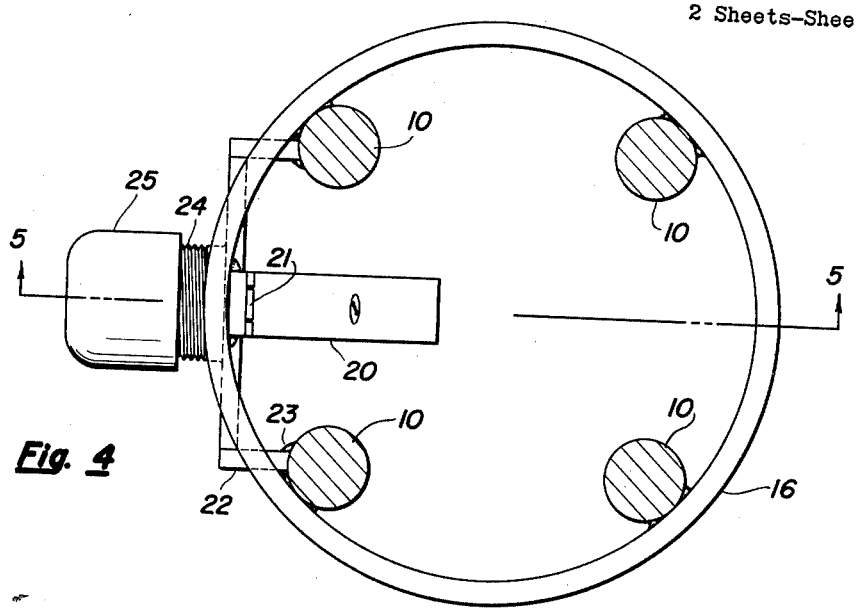
Figure 5:
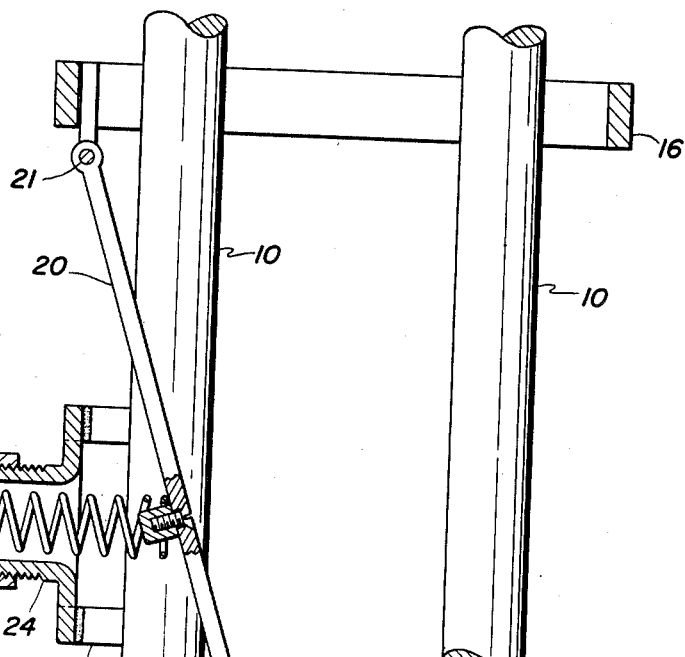

Fig. 3 a cross sectional view on the line 3—3, Fig. 2;

Fig. 4 an enlarged horizontal section on the line 4—4, Fig. 1 but with the bottles removed; and, Fig. 5 a cross sectional view along the line 5—5, Fig. 4 and showing my improved bottle retarding mechanism which forms a part of the invention.

Broadly, the means employed in the embodiment herein illustrated and described comprises a bottle chute comprising a plurality of rods extending from a bell top mouth substantially vertically through a building floor and therebelow. A plurality of ring members are vertically spaced from the mouth and from each other and secured to the rods for maintaining the dimension of the enclosure which they form, and retarders are hinged to some of the rings with their free ends biased into the enclosure by adjustable spring means secured to the rods.

With this arrangement, different building size requirements can be met by merely using different size ring members, and different retarding effects can be simply achieved by varying the spring pressure and/or the point of attachment of the rings on which retarders are hinged.

In accordance with the invention, a chute is fabricated of a plurality of substantially vertically extending, equi-spaced rods 10, four such rods being shown in the drawings. This number is not exactly critical because any number of three or more would be sufficient to define the desired enclosure extending from the top of the chute to its bottom.

At the top of the chute there is a tubular cap 11, having a bell mouth 12 into which bottles 13 may be readily introduced. The dimensions of the principal length of the enclosure formed by the rods is the same as the dimension inside the lower part of the tubular cap 11, and to this end the upper ends of the rods are bent outwardly adjacent their upper ends to engage holes 14 provided in lower flange projections 15 of the top cap 11.

Vertically spaced from top cap 11 and from each other, are a plurality of annular rings 16, secured to the rods 10 by welding contacting portions of ring inner diameters and rod outer diameters (see Fig. 4). These rings serve to preserve the predetermined dimension of the enclosure formed by the rods.

As shown in Fig. 1, one of these rings may be located adjacent the building floor 17 and another may be located at the termination of the rod lower ends which may be curved as at 18 so that bottles 13 will discharge substantially horizontally into a bin such as that indicated by broken lines at 19.

In order that bottles will be prevented from falling too rapidly through the chute, I have provided easy-to-fabricate retarding means, which in the illustrated embodiment comprises one retarding device located near the lower end of the chute, and a similar one a short distance beneath the floor. Each of these retarding devices comprises a bar 20 pivotally connected at 21, that is at its top, to one of the rings 16, and having its free end spring biased into the enclosure by adjustable spring means secured to adjacent rods.

As shown, the arrangement takes the form of angle irons 22 welded at 23 to the outside of adjacent rods 10, and supporting a threaded flange 24, with a bell cap 25 threadedly engaging the flange for adjustably controlling the bias of a compression spring 26, urging bar 20 away from bell cap 25, all to the end of preventing bottles from dropping freely through the chute.

In operation, the chute is first filled with empty bottles 13, and then every time a bottle is inserted at the top of the chute, the lowermost bottle is ejected from the bottom of the chute. The spring pressed bars 20 hold bottles from dropping entirely through the chute, and obviously any building size, i. e., basement to ceiling height, can be accommodated by merely cutting and bending the rods to suit, any size bottles can be accommodated by merely providing the proper size retaining rings 16, and any basement to ceiling height, any weight bottles, and any other conditions (such as sliding friction conditions) can be readily compensated for by adjusting the retarder spring force, as by turning the bell caps 25 clockwise or counter clockwise as required.

While a particular embodiment of the invention has been illustrated and described, various modifications may obviously be made, and I desire it to be understood that the invention is not to be limited to the embodiment shown, and I intend in the appended claims to cover all modifications within the true spirit and scope of the invention.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details disclosed.

Having now described the invention or discovery, the construction, the operation, and use of preferred embodiments thereof, and the advantageous new and useful results obtained thereby; and the new and useful constructions, and reasonable mechanical equivalents there-

I claim:

1. In a free fall motion retarder for a merchandise chute forming an enclosure, the combination of a bar pivotally connected at its top to a portion of said chute outside of said enclosure, a threaded annular flange secured to said chute outside the limits of said enclosure and extending outward therefrom below said point of pivotal connection, a bell cap threadedly engaging the threads of said annular flange, and a compression spring extending between said bell cap and said bar and serving to urge said bar into said enclosure with a force dependent upon adjustment of said bell cap upon the threads of said flange.

2. In a free fall motion retarder for a merchandise chute having a plurality of equi-spaced rods forming an enclosure, the combination of a bar pivotally connected at its upper end to a portion of said chute outside of said enclosure, angle members attached to the outer sides of two adjacent rods, an externally threaded tubular member connected to said angle members and extending outwardly therefrom below said points of pivotal connection, a bell cap threadedly engaging the threads of said tubular member, and a compression spring extending between said bell cap and said bar and serving to urge said bar into said enclosure with a force dependent upon the adjustment of said bell cap upon the threads of said threaded tubular member.

References Cited in the file of this patent

UNITED STATES PATENTS

| | | |
|---|---|---|
| 549,121 | Garnes | Nov. 5, 1895 |
| 1,484,241 | Tompkins | Feb. 19, 1924 |
| 1,686,884 | Trenor | Oct. 9, 1928 |

FOREIGN PATENTS

| | | |
|---|---|---|
| 382,376 | Great Britain | Oct. 27, 1932 |
| 542,392 | Great Britain | Jan. 7, 1942 |
| 545,673 | Great Britain | June 8, 1942 |
| 803,311 | France | June 29, 1936 |